June 10, 1930.　　　F. H. HIBBARD　　　1,762,780
ELECTRICAL MEASURING INSTRUMENT
Filed Dec. 24, 1924
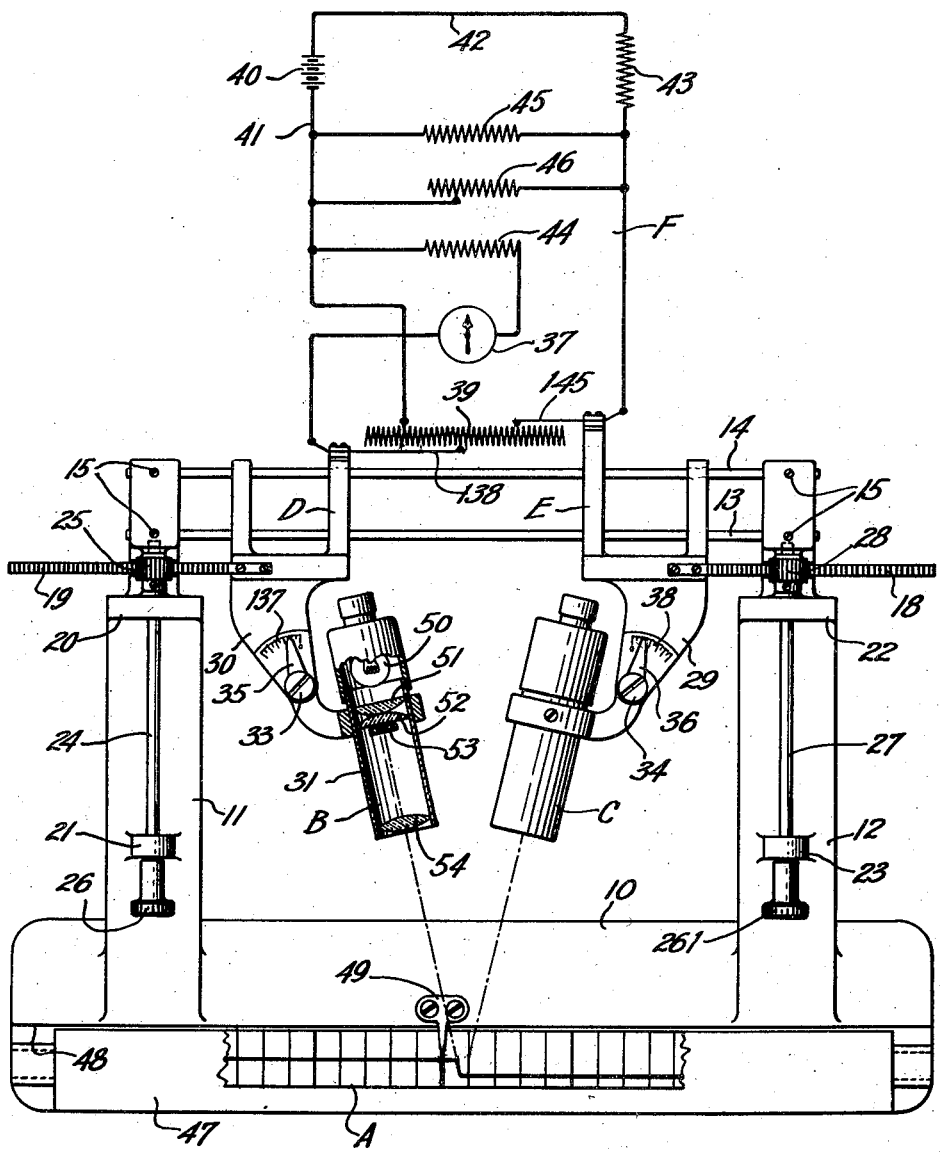
Inventor:
Frank H. Hibbard,
by E. W. Adams, Atty Patented June 10, 1930

1,762,780

UNITED STATES PATENT OFFICE

FRANK H. HIBBARD, OF ARLINGTON, NEW JERSEY, ASSIGNOR TO WESTERN ELECTRIC COMPANY, INCORPORATED, OF NEW YORK, N. Y., A CORPORATION OF NEW YORK

ELECTRICAL MEASURING INSTRUMENT

Application filed December 24, 1924. Serial No. 757,821.

This invention relates to measuring instruments and more specifically to a measuring device particularly well adapted for use for reading oscillograph films and the like.

As is well known, oscillographs are generally used for obtaining a visible representation of the oscillations of an alternating current which are transmitted in the form of reflected light rays to a moving photographic film for purposes of record.

The practical application of the oscillograph, for example to the measurement of time intervals required for switching devices to operate or release has developed a standard practice of printing on the film, by means of a tuning fork controlled by a synchronous motor, time lines at intervals of .010 seconds. As it is essential to measure time intervals to the nearest .001 second, it is necessary to estimate to the nearest tenth part the linear distance between time lines. This may be done to the nearest thousandth of a second with a precision ±.001 second by the unaided eye. Continuous application of a worker to this form of observation, however, gives severe eye strain and reduces the accuracy of observation materially.

The object of this invention is to provide an instrument of the character above referred to which will be accurate, simple in operation, and which will enable the operator accurately to read oscillograph film much faster than heretofore and without serious eye strain.

The instrument of this invention is based on the proportionality characteristic of a potentiometer. If a potentiometer has uniform resistance per unit of linear length, the voltage across any fraction of its length will be the same fraction of the total voltage across the potentiometer. This principle is utilized in the structure of this invention by a fine coiled potentiometer having a fixed contact at one end and a sliding contact at the other in addition to a sliding contact between the two ends. Thus the total linear length of the potentiometer is variable. The voltage on the potentiometer is so maintained as to give a galvanometer deflection of ten units for example, when connected across the whole length of the potentiometer. The galvanometer being connected to the movable midpoint, thus reads the distance in tenth parts of the total distance.

The two sliding contacts on the potentiometer are connected to two light projectors whereby the two hair line images are projected on the points bounding the distance to be measured on the film and the galvanometer connected to the sliding contacts will indicate the proportion of the drop picked off by the sliding contacts and consequently will indicate the distance between the two points on the film bounded by the hair line images.

Other features of the invention and advantages will appear from the following description and by the claims appended hereto, reference being had to the accompanying drawing in which A indicates an oscillograph film shown in position on the base plate of the machine, B and C are the light projectors adapted for projecting the images of two hair lines on the film, D and E are the carriages for moving the projectors and the brushes of a rheostat in adjustment with respect to the time lines on the film, and F is a diagrammatic view of the galvanometer operating circuit.

In its detailed construction, this measuring device generally consists of a base 10 having two upright supports 11 and 12 on which two parallelly disposed bars 13 and 14 are mounted and held securely by means of screws 15.

The carriages E and D are slidably mounted on bars 13 and 14 and each carries a gear toothed rack 18 and 19 for a purpose that will be hereinafter described. The upright support 11 is provided with two laterally extending brackets 20 and 21 in which the shaft 24 is journalled. On the upward extending end portion of shaft 24 there is secured a pinion 25 disposed in operable relation with the toothed rack 19 and on the downward extending end portion of this shaft there is provided a knob 26 adapted for manually moving the carriage D along the bars 13 and 14. Similarly, on the upward extending end portion of shaft 27, there is securely mounted a pinion 28 disposed in operable relation with the gear toothed rack 18 and a knob 261 secured to the downward extending end portion of this shaft is provided for moving the carriage E along the bars 13 and 14.

The carriage D carries a brush 138 disposed in contacting relation with a coil 39 which has its longitudinal axis disposed in line parallel to the direction of movement of the carriages E and D. Similarly, carriage E carries a brush 145 disposed in contacting relation with the coil 39. The brushes 138 and 145 form part of a galvanometer operating circuit which will be hereinafter described.

On each carriage E and D there is provided a downwardly extending bracket 29 and 30 on which the light projectors 31 and 32 are mounted and held in adjusted position by means of set screws 33 and 34, respectively.

The projectors B and C are each provided with a pointer 35 and 36 adapted to move adjacent the face of their respectively associated graduated dials 137 and 38, which are adapted to facilitate the setting of the projectors in any desired angle.

Each light projector preferably consists of a tube 31 in which is mounted an incandescent lamp 50, two plano-convex lenses 51 and 52 and a glass or celluloid strip 53 on which a hair line in the form of a fine wire or groove is provided and adapted to be projected on the film A by means of a double convex or objective lens 54 secured on the downwardly extending end portion of the tube. Through this combination of lenses the images of the two hair lines are projected onto the film in very thin lines, the length of which is preferably the width of the film.

The operating circuit of the galvanometer includes the coil or rheostat 39 which is associated with the slidable brushes 138 and 145. The brush 145 is connected to one side of battery 40 or another source of constant potential current through a resistance 43. The other side of battery 40 is permanently connected to the rheostat 39 by means of conductor 41. The brush 138 is connected to one terminal of the galvanometer 37 which has its other terminal connected to conductor 41 through resistance 44. A resistance 45 and a resistance 46 are bridged across the conductors 41 and 42. Resistance 46 is made adjustable for the purpose of obtaining the zero position of the galvanometer pointer when the hair line of projector B coincides with the pointer 49 on the base 10 and consequently the brush 138 with the terminal of conductor 41 attached to the coil.

In calibrating this instrument the slider brush 138 shall be placed on the same wire turn of the rheostat 39 as the fixed brush connected to wire 41 and the cross hair line projected by projector B and the fixed pointer 49 made to coincide. Similarly on the other end of the slider brush travel, the said slider brush 138 and movable brush 145 shall rest on the same turn of rheostat 39, and the cross hair lines projected by C and B made to coincide on any time line at the right of 49. The galvanometer shall then read 10. The variable rheostat 46 is used in making this adjustment. Having made these adjustments the instrument is ready for use. The film is placed on the table of the machine so that pointer 49 is directly on the time line marking the beginning of the interval it is desired to subdivide, the hair line C being set to coincide with the adjacent time line at the right of 49. Now set the slider cross hair line of B on the desired point on the film and the galvanometer will read the decimal part of the distance between the two time lines at which the slider cross hair line is set.

Now assuming that the distance to be measured on the photographic film occurs midway between the two time lines it is obvious that the galvanometer pointer will be deflected from 0 to 5 or its middle position. Similarly a movement of the projector B at any point between these time lines will cause a proportionate deflection of the galvanometer to indicate the distance.

The instrument of this invention enables a man to do the work of three or four without extended training and without serious eye strain. It can be arranged to read inches and is particularly useful in the measurement of dimensions on broken up surfaces of machine parts which cannot be conveniently reached by micrometers. By means of this instrument linear distances can be measured to a precision of ±.005 of an inch. The rheostat 39 may be made of #40 resistance wire wound on a circular core having a diameter of half an inch. In selecting resistances for the various parts of the network, the values should be such as will make the potential drop in dependent parts of the circuit, due to the current drawn by the resistance in question, negligible. This means that the resistances 43 and 45 directly across the source of potential should be relatively small, that the resistance of the rheostat should be a number of times larger, and that the meter circuit should be many times greater, of the order of one hundred times, than that of the rheostat. Since the resistance of the rheostat is the governing quantity, it is about this resistance that the network should be built. No. 40 wire has a resistance of 30 ohms per foot approximately, hence, assuming the diameter of the core to be ½″, and that the wire and insulating enamel make a combined uniform diameter of .004″, the resistance of one inch of rheostat will be approximately 1000 ohms, and there will be 250 turns of wire per inch. This means that if the slider 138 touches only one wire at a time, to obtain an accuracy of 1% there should be 100 turns available; this corresponds to a distance of .4″. In other words, if the time lines are spaced .4″ or greater apart, the accuracy of the instrument will be 1% or greater, that is, it will be possible to measure time accurately to the nearest .0001 second, or to even smaller intervals if the spacing of the time lines is greater than .4″.

The potential impressed across the rheostat should be of such a maximum value that there will be no tendency toward overheating, and of a minimum value such that the resistance in series with the meter will be sufficiently large, as before mentioned. For the meter selected, a micro-ammeter with an 18 micro-ampere scale, a potential of approximately 2 volts seems to satisfy both conditions, as the rheostat is only called upon to radiate about .01 watt, and to use the meter from 0 to 10 micro-amperes, a resistance of 200,000 ohms must be inserted in series with the meter.

To compensate for line voltage variations in order that the drop across 45 and 46 will always be of a constant value, the resistance 46 should be made variable, and have a range of 0 to 7 ohms. A variable resistance of this range, when used in parallel with a fixed resistance of 3 ohms, forms a combination which gives a relatively fine variation in resistance over a large range, thus making it possible to compensate comparatively large changes in line voltage.

It is to be understood that this device may be used for effecting similar measurements on any object which may be accommodated on the cable of the machine.

What is claimed is:

1. In a distance measuring device, a frame, a plurality of means for locating the boundaries defining a distance to be measured, means slidably mounted on said frame for moving the first mentioned means to coincide with said boundaries, a circuit, a galvanometer connected in said circuit, and electrical means controlled by the movement of said slidable means for controlling the operation of said galvanometer for indicating the distance in a number of predetermined units.

2. In a distance measuring device, a frame having a base for receiving an oscillograph film having lines thereon, a number of means movable in a direction parallel to said base to locate a portion of the film to be measured, manually operable means for moving said first mentioned means, and means including a galvanometer controlled by the movement of said first mentioned means for indicating the distances between the lines projected on said film in a number of predetermined units.

3. In a measuring device, a frame having a base to receive an oscillograph film, a plurality of means on said frame to locate a distance to be measured, a coil disposed in the direction of movement of said means, a circuit, a source of constant potential current for supplying said circuit, a pair of wipers in said circuit in contact with said coil and movable through the movement of said means, and a galvanometer in said circuit for translating electrical effects into a number of units spaced in accordance with the adjustment of said means.

4. In a distance measuring device, a frame having a base to receive an oscillograph film, a plurality of means on said frame to locate a distance to be measured, a circuit, a potentiometer in said circuit, a pair of brushes in said circuit movable with said means and wiping over said potentiometer, and means for translating the drop of potential in said circuit into a predetermined number of units spaced in accordance with the variation of said distances.

5. In a distance measuring device, a frame, means in said frame guiding an oscillograph film, said film having time marks defining a portion of the film to be measured, light projectors each movable in a direction parallel to the length of said film to project points of reference on said marks, gearing mechanisms for moving said projectors and means controlled by the movements of said projectors for indicating the distance between said marks in a fixed number of units.

6. In a distance measuring device, a frame, means in said frame for receiving the object to be measured, said object having spaced marks bounding distances to be measured, each in an equal number of units, and marks of another character variably disposed with respect to the marks of the first character and bounding other distances to be measured in said units, indices, means for moving said indices on the marks of the first character for predetermining the space between said units, and means responsive to a further movement of one of said indices on a mark of the second character for indicating the number of units between the last mentioned mark and one mark of the first character.

In witness whereof, I hereunto subscribe my name this 17th day of December, A. D., 1924.

FRANK H. HIBBARD.